US007187987B2

(12) United States Patent
Andersen

(10) Patent No.: US 7,187,987 B2
(45) Date of Patent: Mar. 6, 2007

(54) METHOD AND A CONTROL SYSTEM FOR CONTROLLED OPERATION OF MOVABLE MEMBERS

(75) Inventor: Kim Arthur Stück Andersen, Niva (DE)

(73) Assignee: VKR Holding A/S, Soeborg (DK)

( * ) Notice: Subject to any disclaimer, the term of this patent is extended or adjusted under 35 U.S.C. 154(b) by 295 days.

(21) Appl. No.: 10/506,079

(22) PCT Filed: Feb. 21, 2003

(86) PCT No.: PCT/DK03/00116

§ 371 (c)(1),
(2), (4) Date: Aug. 31, 2004

(87) PCT Pub. No.: WO03/074946

PCT Pub. Date: Sep. 12, 2003

(65) Prior Publication Data

US 2005/0209710 A1 Sep. 22, 2005

(30) Foreign Application Priority Data

Mar. 1, 2002 (DK) .............................. 2002 00320

(51) Int. Cl.
*G05B 11/01* (2006.01)

(52) U.S. Cl. .......................................... 700/20; 700/27

(58) Field of Classification Search .................. 700/20, 700/9, 13, 19, 275, 277, 27, 278
See application file for complete search history.

(56) References Cited

U.S. PATENT DOCUMENTS 4,019,172 A 4/1977 Srodes
4,630,221 A * 12/1986 Heckenbach et al. ....... 700/277
4,805,519 A 2/1989 Boddey et al.
4,933,613 A 6/1990 Berner et al.
5,226,256 A 7/1993 Fries et al.
5,449,987 A 9/1995 McMillan
5,831,848 A * 11/1998 Rielly et al. ................... 700/3
5,860,592 A * 1/1999 Dozier et al. ............. 236/49.3
6,192,282 B1 * 2/2001 Smith et al. .................. 700/19
6,859,668 B1 * 2/2005 Ginzburg et al. ............ 700/19

FOREIGN PATENT DOCUMENTS

EP 0 397 179 A2 11/1990
WO WO 00/39506 7/2000
WO WO 02/01116 A1 1/2002

* cited by examiner

*Primary Examiner*—Thomas Pham
(74) *Attorney, Agent, or Firm*—Merek, Blackmon & Voorhees, LLC

(57) ABSTRACT

Operation of movable members such as wing or sash parts of openable windows or facade sections forming part of a natural ventilation system is controlled by communication of operating commands from centralized and/or distributed control means to operator units for movement of said movable members. Concurrent operation of operator units of a sub-group (1, 2, 8–11) of operator units (3) associated with a single movable member is coordinated by interface means (6, 7) interconnected between the sub-group and the centralized and/or distributed control means (4, 16). The interface unit (6, 7) communicates an operating command from said central and/or distributed control means (4, 16) to the operator units (3), receives actual position and/or status information from each operator unit (3) of the sub-group and uses this information for communication of coordinated individual control commands to the operator units (3). Communication between all operator units of the sub-group and the interface means is effected on a single communication line.

34 Claims, 4 Drawing Sheets

METHOD AND A CONTROL SYSTEM FOR CONTROLLED OPERATION OF MOVABLE MEMBERS

The present invention relates to a method and a control system for controlled operation of movable members by communication of operating commands from centralized and/or distributed control means to operator units for movement of said movable members.

The invention further relates to interface and operator units for use in such a control system.

Whereas a preferred useful application of the invention relates to natural ventilation of one or more ventilation zones in a building by operation of passive ventilation members like e.g. openable window or facade sections, adjustable ventilation dampers, grids and similar devices, the invention may be applied in general to control of a variety of types of movable members.

BACKGROUND OF THE INVENTION

Published international patent application WO 00/39506 provides a general disclosure of a computer controlled method and system for controlled natural ventilation of ventilation zones in a building by adjustment of passive ventilation devices, typically in the form of openable window sections in building facades or other forms of openable facade sections such as adjustable ventilation dampers, grids and similar devices. The control strategy followed in this prior art method involves periodically repeated estimation of the ventilation demand of a zone from a physical parameter such as the volume of the zone, a target value for the indoor temperature of the zone and measurement of actual indoor and out door temperatures, correction of the estimated demand in dependence of additional indoor climatic variables such as $CO_2$ content to determine an adjustment factor for each ventilation device belonging to the zone and individual correction of adjustments factors thus determined in dependence of additional outdoor climatic variable such as wind load and direction and/or a user actuated adjustment of a ventilation device.

In published international patent application WO 02/01116 a further development of this method to provide comfort optimization for human occupants in the ventilation zone is disclosed.

The ventilation devices employed in such a method or system will as mentioned typically comprise openable windows or other openable facade sections comprising a wing or sash part arranged in a stationary main frame structure to be movable between a closed position and a ventilation position, whereby movement of the wing or sash part is performed by means of at least one electrical operator unit such as a conventional chain operator.

For a relatively simple and small ventilation device a single operator unit may be sufficient for the controlled operation of such a wing or sash part, but frequently a number of operator units will be required for a single ventilation device, e.g. for the movement of a rather heavy wing or sash part and/or for locking and unlocking the wing or sash part in its closed position with respect to the main frame structure in addition to movement of the wing or sash part between its closed position and the ventilation position.

In automatic control systems for natural ventilation of large building comprising a plurality of ventilation zones, a large number of windows placed all over the building may be operated in this way by electrical operator units receiving operating commands from centralized control means incorporating computer means for the determination of control parameters such as a target ventilation position for individual operators in dependence of various climatic parameters, such as air temperature and humidity, $CO_2$ content and wind load as well as external noise from traffic or the like and communication of corresponding control commands to the operator units associated with ventilation devices by remote control. Thereby, a ventilation device such as a window may be moved several times between different positions, which may not always correspond to the closed position or a maximum ventilation position.

For proper exercise of building climate control it is important therefore that exact information of the actual or current positions of all ventilation devices such as windows is made continuously available to the centralized control means.

In prior art electrical window control systems provision of such position information has traditionally been based, however, on relatively simple estimation of the wing or sash position from operation parameters such as the duration and magnitude of the current to a drive motor in an operator unit, using the closed position of the wing or sash part as zero reference. Evidently, use of such an estimation strategy in automatic window control systems would require closing of windows every once in a while in order not to loose track of their position. Otherwise errors in the estimates from the repeated opening and closing movements might accumulate leading to incorrect estimates of the window position.

In a computer-controlled window system for a building disclosed in EP-A2-0 397 179 electrical operation of the locking/unlocking and opening/closing functions of a plurality of windows is accomplished by microprocessors assigned to individual windows or groups of windows. For each window the actual condition of its locking means as well as the actual position of the sash member are communicated to the microprocessor associated with the window from sensor devices arranged at the window and for the overall system these sensor signals are communicated for all windows from the microprocessors to a common central monitoring unit for optical indication of the current condition of each window. Command signals for operation of individual windows or joint operation of a group of windows served by the same microprocessor are communicated to the respective microprocessors either from portable or stationary local remote control units or, via a data bus, from the common central unit. In response to such command signals the function of the microprocessor vis-à-vis a single window is limited to sequential operation of separate motors for the locking/unlocking and the opening/closing functions of the window.

In addition to this relatively limited use of the sensor signals communicated from the individual windows for control purposes the use of several separate sensor devices at each window to provide sensor inputs to the microprocessors requires a corresponding amount of physical wiring between a microprocessor and each window served thereby with resulting complications and costs of installation.

SUMMARY OF THE DISCLOSURE

On this background it is the object of the invention to provide a method and a system for the computerized control of natural ventilation, by which a truly coordinated operation of a sub-group of operator units associated with a single movable ventilation member is obtained, which is useful not only for sequential operation of separate operator units for locking/unlocking and opening/closing functions, but also for concurrent operation of separate operator units of such a sub-group used for opening and closing of a wing or sash structure involving joint operation of several operator units, and which may be accomplished by a significantly less complicated communication arrangement.

For a method of the kind defined this object is achieved, according to the invention by coordination of sequential and/or concurrent operation of operator units of a sub-group of operator units associated with a single movable member by interface means interconnected between said sub-group and said centralized and/or distributed control means, said coordination including communication of an operating command for said single movable member from said central and/or distributed control means to said interface means, generation of actual position and/or status information in each operator unit of said sub-group, communication of said position and/or status information from said operator unit to said interface means and using said position and/or status information by said interface means for communication of coordinated individual control commands to the operator units of said sub-group in response to said operating command for said single movable member, whereby the communication between all operator unit of the sub-group and said interface means is effected on a single communication line.

Compared to the prior art method of EP-A2-0 397 179 the method of the invention provides a novel and significantly less complicated solution to the sequential operation of a number of operator units of a sub-group associated with a single passive ventilation member. Moreover, the method of the invention provides for a novel real time coordination of concurrent operation of a number of operator units and thereby a significant advantage in the typical case, when several operator units are to be operated simultaneously for moving the wing or sash part of a window in an opening or closing direction.

Preferred and advantageous implementations of the method are stated in dependent claims 2 to 10.

Thus, a preferred performance of the method is characterized in that in response to an operating command for opening or closing of said single ventilation member communicated from said centralized and/or distributed control means a control command including a target position and a target speed of operation is communicated from said interface means to each operator unit, and that in dependence of position and/or status information received from the operator units new individual control commands including modifications of said target speed as needed to provide synchronized concurrent operation of said operator units is subsequently communicated by said interface means to individual operator units of said sub-group.

For the performance of the method as defined a control system according to the invention is characterized in that for at least one movable ventilation member a sub-group of associated operator units is provided, and that an interface unit common to the operator units of said sub-group is interconnected between said operator units and said centralized and/or distributed control means for coordinated concurrent operation of said operator units, each of said operator units comprising means for generation of actual position and/or status information for said movable member and said interface unit comprising microprocessor means adapted to receive said operating commands from said centralized and/or distributed control means and said actual position and/or status information and to communicate coordinated individual control commands to the operator units of the sub-group in response to said operating command and said position and/or status information, whereby all communication between said interface unit and all operator units of said sub-group is effected on a single communication line.

Preferred and advantageous embodiments of such a ventilation system are stated in dependent claims 12 to 19.

The invention also relates to an interface unit for use in such a control system, and characterized by being adapted for interconnection between a sub-group of operator units associated with a single movable member and said centralized and/or distributed control means for coordinated sequential and/or concurrent operation of the operator units of said sub-group and by comprising microprocessor means adapted to receive said operating commands from said centralized and/or distributed control means and said actual position and/or status information and to communicate coordinated individual control commands to the operator units of the sub-group in response to said operating command and said position and/or status information, the interface unit comprising means for communication with each operator unit of said sub-group via a single communication line.

Preferred and advantageous embodiments of such an interface unit are stated in dependent claims 21 to 28.

Equally the invention relates to an operator unit for use in the natural ventilation system as defined above and characterized by comprising a motion transfer member for operation of a movable member, means for generation of actual position and/or status information for said movable member and means for communication with said interface unit via a single communication line.

BRIEF DESCRIPTION OF THE DRAWINGS

In the following the invention will be described in greater detail based on an exemplary embodiments, and with reference to the schematic drawings, on which

Figure 1:
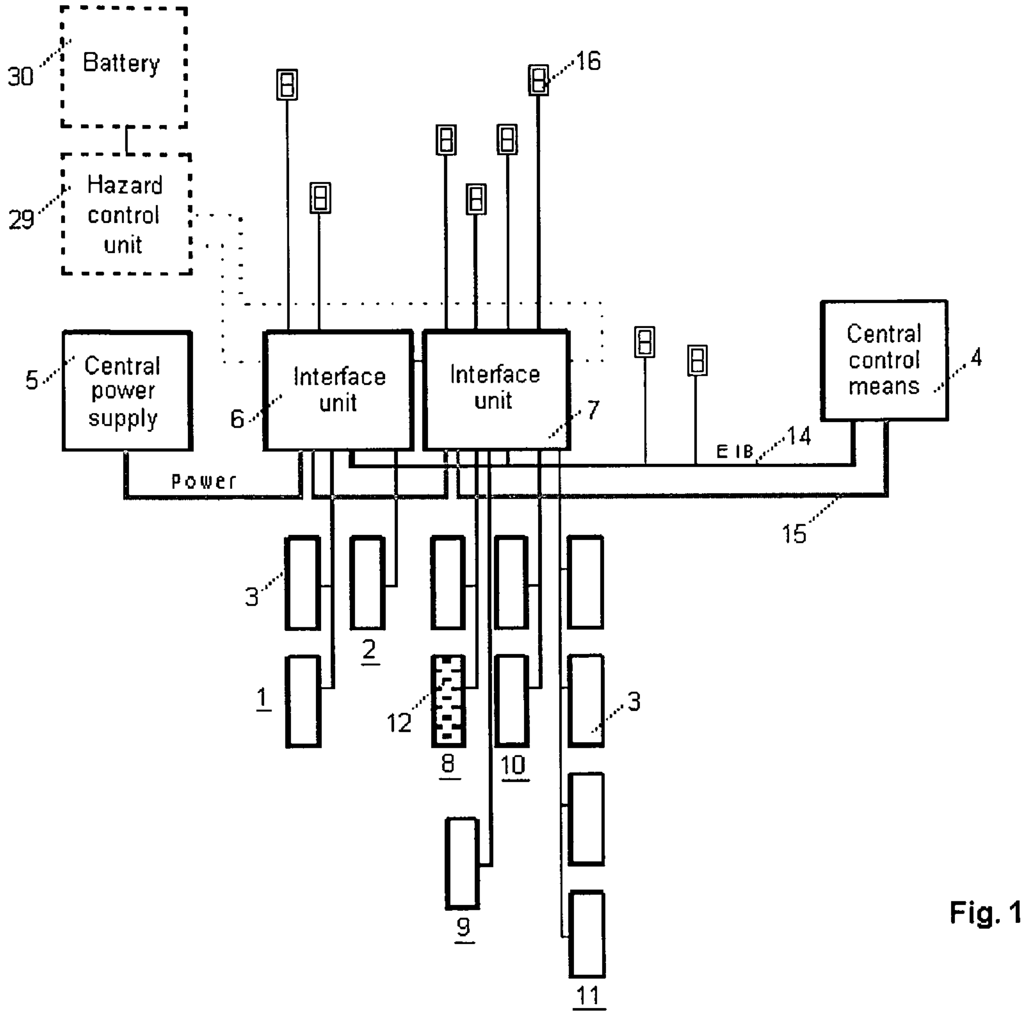
FIG. 1 is a simplified basic control diagram for a control system for natural building ventilation embodying the invention.

In the control system illustrated in FIG. 1 by way of a simplified block diagram sub-groups 1 and 2 of operator units 3 are connected with a centralized control means 4 comprising a ventilation system computer and a centralized power supply unit 5 via an interface unit 6.

In the illustrated example sub-group 1 comprises two operator units 3 for movement of a single passive ventilation member such as an openable window comprising a wing or sash part arranged to be movable with respect to a stationary frame structure, whereas sub-group 2 comprises a single operator unit 3 associated with another single ventilation member, whereby movement of the two ventilation members is controlled by the interface unit 6.

A further interface unit 7 is connected with the central control means 4 and the central power supply unit 5 for the control and coordination of four subgroups 8 to 11 of operator units, which in the example illustrated comprise a number of operator units 3 serving the opening and closing of movable window wing or sash parts as described above, whereas one of the sub-groups 8 comprises in addition a special operator unit 12 used for the operation of a locking mechanism for locking and unlocking the wing or sash part of a window with respect to the stationary frame part as known per se, e.g. from EP-A2-0 397 179 mentioned above.

Thereby, interface units 6 and 7, each of which may each be assigned e.g. to a single room of a building incorporating a natural ventilation system, may control and coordinate the operation of a relatively large number of operator units 3 or 12 organized in sub-groups each associated with a single passive ventilation member. As shown for the sub-group 8 the operator units 3 and 12 may be operated sequentially for opening/closing and locking/unlocking of a window wing or sash part with respect to a stationary frame, respectively. All other operator units 3 of sub-groups 1, 2 and 8 to 11 may be of the same type and be operated concurrently for opening/closing of a window wing or sash part.

Each of operator units 3 may comprise a chain operator of a type known per se with a chain connected with the window wing or sash part engaged by a chain or sprocket wheel driven by a reversible electric motor via suitable transmission means for movement of the wing or sash part in an opening direction or closing direction, respectively.

In the system shown in FIG. 1 data communication between the central control means 4 and each of interface units 6 and 7 is effected via a serial communication bus 14 such as an EIB (European Installation Bus) and power supply to the interface units 6 and 7 from the central power supply unit 5 is effected on a power line 15. Moreover, in the illustrated example each sub-group of operator units may in addition to operation by command from the central control means be operated by a distributed local control means 16 such as a portable or stationary remote control device individually assigned to the sub-group and the single passive ventilation member associated therewith.

Figure 2:
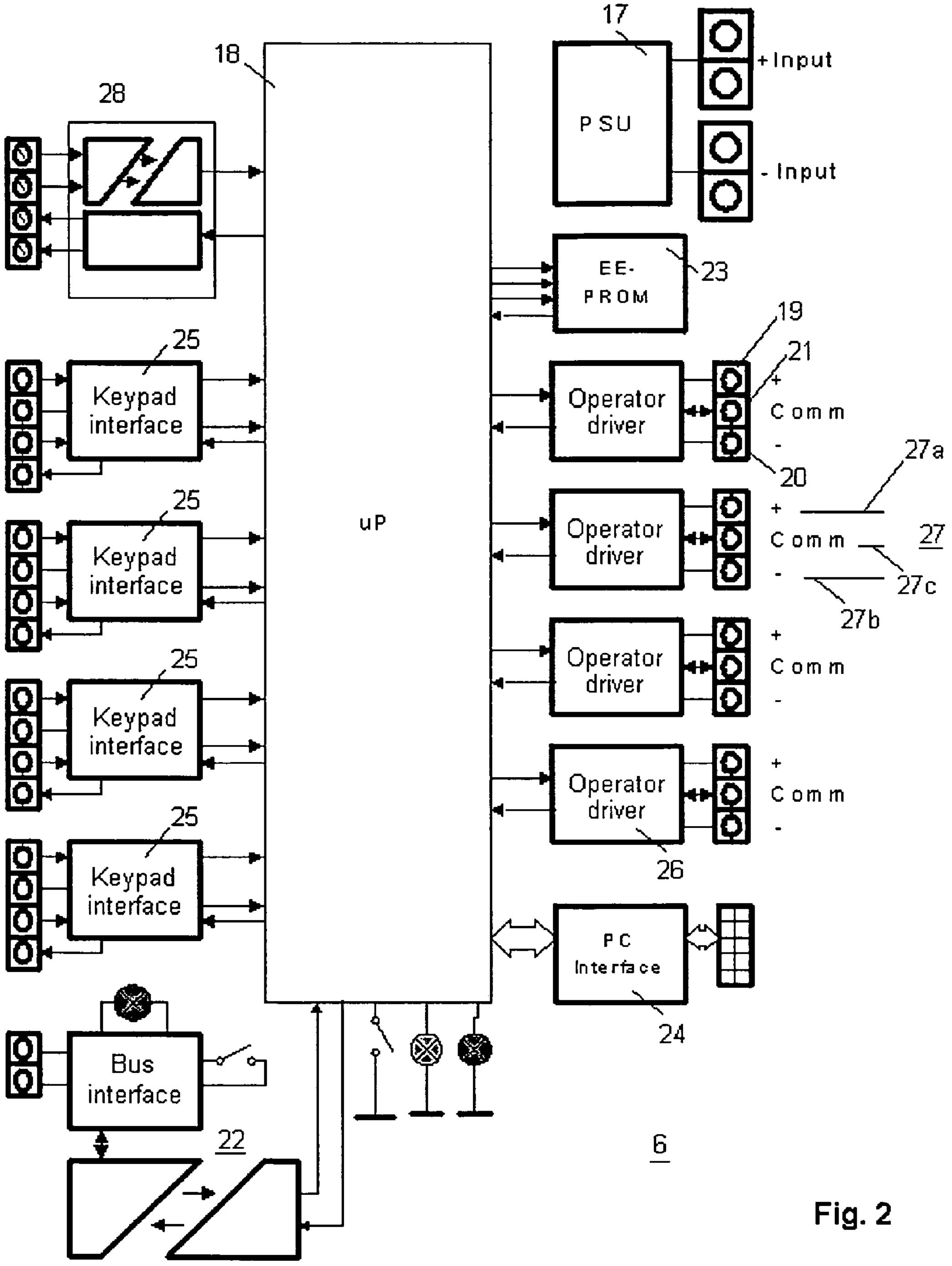
FIG. 2 is a schematic diagram of an interface unit in the ventilation system shown in FIG. 1.

As shown in FIG. 2 each of interface units 6 and 7 comprises a power supply unit (PSU) 17 connected with the power line 15. In a preferred embodiment the power supply unit 17 receives DC power supply from the central power supply unit 5 shown in FIG. 1. The power supply unit 17 of the interface unit may simply be voltage adapting circuitry for the various voltages needed by different parts of the interface unit itself, on one hand, and for the operation of the operator units 3 or 12, respectively, of the sub-groups of operator units served by the interface unit, on the other hand. Alternatively, the power supply unit 17 may also include galvanic separation for the various consuming parts. Thus, the DC supply current from the central power supply unit 5 is used both to supply a microprocessor 18 in the interface unit and all of the electrical window operator units 3 and 12, respectively, as well as other circuitry.

Each operator unit 3 is connected with the interface unit 6 or 7 by three conductors comprising two power supply lines and a single communication line. The three conductors may be connected to the interface unit 1 using standard terminals 19, 20, 21, such as screw terminals. The external DC supply current is preferably fed directly to the two terminals 19, 20 connected with the power supply lines.

As will appear, the interface unit 6,7 is built around the microprocessor 18, which may communicate with the EIB bus 14 by means of a bus interface 22. For additional storing capacity the interface unit 6 or 7 may further comprise an optional EEPROM 23 connected with the microprocessor 18. For reprogramming of the EEPROM 23 the interface unit 6 or 7 may further include a PC interface 24 for connection of the interface unit 1 to a personal computer (not shown). Alternatively the EEPROM 23 may be reprogrammed from the central control means 4. Typically EEPROM 23 may contain control parameters for the operator units 3, such as target speed, target position, maximum opening time, etc.

For controlling the operation of the ventilation members associated with the sub-groups of operator units served by the interface unit, the microprocessor 18 may communicate with each of operator units 3 via terminal 21 and the single communication line connected therewith. The control effected by his communication may either be automatic, i.e. caused by commands from the central control means 4, or selective, by a command communicated from distributed local means 16 as shown in FIG. 1.

In case of automatic operation the interface unit 6 or 7 receives instructions to open or close the window from the central control means 4 via the data bus 14.

In case of selective operation, opening or closing is effected by communication from the distributed local control means 16, which may comprise a number of keypads, each via a keypad interface 25.

For the individual control of the various subgroups of operator units 3, 12 the interface unit 6 or 7 comprises a number of operator drivers 26. In the illustrated preferred embodiment each of drivers 26 may control a sub-group comprising up to four operator units 3 for opening and closing of a window wing or sash part and, in addition, up to two operator units 12 for locking/unlocking of the wing or sash part in the closed position of a window.

Data communication and power supply from the interface unit to all operator units 3 and 12, respectively, served thereby is effected via a single common cable 27 as shown in FIG. 1, which as mentioned incorporates two power supply lines 27*a* and 27*b* and a single data communication line 27*c*, connected with terminals 19, 20 and 21, respectively. Preferably, the operator units 3, 12 of the same sub-group are connected in parallel to the common cable 27. Individual cabling for each operator unit of a sub-group is also possible, however, but will involve substantially more resources, e.g. more cable length.

The structure of the cabling with the cable 27 including three lines only, i.e. two power supply lines and a single communication line has been found to provide a good compromise between complexity of communication, which would increase with two lines only, and cabling costs, which would increase with additional lines.

In the illustrated preferred embodiment the DC power supplied from the interface unit 6 to the operator units 3 comprises balanced positive and negative voltages and the data communication on the single communication line 27*c* is effected at the reference voltage level $(V^+-V^-)/2$ of the positive voltage $V^+$ and the negative voltage $V^-$. Thereby, common mode noise is suppressed and the data communication is made independent of voltage drops caused by the motor current. In result, the communication will be less prone to errors.

As an example, if the minimum voltage requirement of the electrical drive motor of each of operator units 3 as used in the preferred embodiment is 18V, the voltages on the two power supply lines 27*a* and 27*b* for each sub-group of operator units from the interface unit 6,7 should preferably be at least +10 V and −10 V, respectively. In view of the accumulated voltage drop on the power supply line 15 from the central power supply unit 5 to the interface unit 6,7 and the power supply lines 27*a* and 27*b* from the interface unit 6,7 to operator unit 3 an appropriate level of the DC power supply delivered by the central power supply unit would be 24 V in order to allow for a desirable maximum length of the power supply lines, e.g. up to 50 meters.

With this power supply the communication line 27*c* for each sub-group of operator units 3 may be operated well within the balanced supply voltages of +10 V and −10 V, respectively. Typically, the voltage difference between high and low states on the communication line could be 4 V to provide a reasonable compromise between the need for noise immunity, which might not be satisfactory at lower voltages, and the demands on communication line drivers, which would increase at higher voltages.

For compliance with stringent safety regulations requiring all ventilation members of a natural ventilation system to be operable for opening and/or closing in emergency situations caused e.g. by smoke or excessive heat developed during a fire, even in case of interruption of the power supply from the central power supply means, the interface unit 6 comprises, in the illustrated preferred embodiment a separate interface 28 for communication with an emergency and hazard control system, which as schematically shown in FIG. 1 may comprise a hazard control unit 29 and emergency power supply means 30, such as a battery.

A suitable emergency and hazard control system is disclosed in applicants international patent application WO 03/001123, published 3 Jan. 2003, the disclosure of which is incorporated herein by reference.

Each of the electrical window operator units 3 controlled by an interface unit 6 or 7 is designed, in general, as an autonomous unit comprising all electronic circuitry needed to receive instructions to move a window from one position to another, control the current for the energizing motor for the window movement, and continuously generate position and/or status information with respect to the actual position of the windows.

Figure 3:
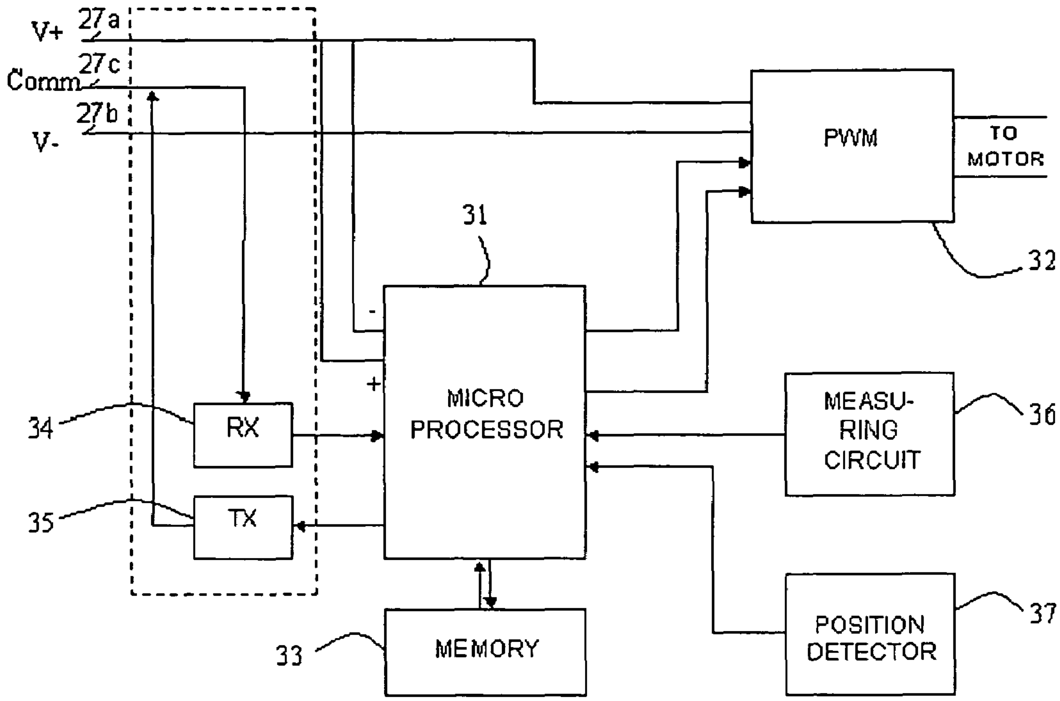
FIG. 3 is a schematic block diagram of an operator unit communicating with an interface unit as shown in FIG. 2.

As an example, FIG. 3 shows a block diagram illustrating electronic components and circuitry of an embodiment of an electrical window operator unit 3 suitable for use in method and system according to the invention.

In the illustrated embodiment the operator unit, representing a unit 3 as shown in FIG. 1 for opening and closing of a movable member such as a wing or sash part of an openable window between a closed position with respect to the stationary window frame and an open ventilation position, comprises a microprocessor 31 controlling the pulse width modulation of a PWM modulated driver stage 32 for a reversible electric dive motor of the unit (not shown) via two direction lines 32*a* and 32*b* controlling the polarity of the output motor current and thereby the sense of rotation of the drive motor. The operator unit 3 further includes a position detector 37 for generation of a position signal representative for the actual position of the movable member operated by the unit 3, such as the wing of sash part of an openable window. To accomplish this the detector may be adapted for detection e.g. of impulses from tacho means or similar means for detection of rotary movement of a rotary shaft of the drive motor or a transmission between the drive motor and the motion transfer member such as an operator chain connecting the movable member with its associated frame structure.

Various information needed for the communication between the interface unit 6,7 and the operator unit 3 is stored in memory means provided in the operator unit 3, e.g. in the form of an EEPROM 33. The information stored in the memory means 33 may comprise identification data comprising a unique factory-set serial number assigned to each individual operator unit 3 under control of the central ventilation system computer 4 as well as a shortened communication ID, which may be loaded during initial set-up of the system and need only be distinctive for each operator of the sub-group or sub-groups served by the same interface unit 6,7. Typically the stored information will further include parameter information essential to the function of the operator unit.

As communication interface means for conduct of the exchange of communications with the interface unit 6/7 the operator unit 3 comprises a receiver 34 and a transmitter 35 connected between the single communication line 27*c* and the microprocessor 31.

Further connected with the microprocessor 31 is in the illustrated embodiment a measuring circuit 36 for measuring the momentary motor current. Thereby, detection of an increase in the motor current indicating blocking of the motor, caused e.g. by the movable member operated by the operator unit 3 having reached an end position or having been stopped in its movement by an obstacle may be processed in the microprocessor 31 and communicated to the interface unit 1, which in response may take appropriate action and may communicate appropriate commands back to the microprocessor 31 in the actual operator unit 3 as well as to other operator units belonging to the same sub-group and being associated with the same movable member as the actual operator unit.

As mentioned the transfer member for effecting movement of the movable member such as a wing or sash part of an openable window between its closed position and a ventilating position may typically comprise a chain having one end connected with a coupling fixture secured to the movable member or the corresponding stationary frame member thereof and the other end engaged by a sprocket wheel accommodated in the operator unit, which is secured to the other of the movable member and the stationary frame member, said sprocket wheel being driven by the electric drive motor of the operator unit via a suitable transmission.

As mentioned the actual position of the movable member may be obtained by means of a position signal obtained in the position detector 37. The position signal may be provided e.g. by a tacho arrangement responding to rotation of any rotary member in the transmission between the drive motor and the transfer member for detection of the current speed of movement of the movable member. From the position detector 37 this position signal may be communicated to the microprocessor 31 together with a signal representing the current direction of movement of the movable member for generation of an overall position signal representing the current position of the movable member with a resolution of approximately 1 mm, by comparing the current speed and direction data with the position signal generated from the latest preceding position signal.

In the normal course of operation the current speed and direction of the drive motor of the operator unit 3 will be determined by the microprocessor 31 by controlling the pulse width modulation in the PWM driver stage 32 in response to target position and target speed data included in a command received from the interface unit 6/7 as well as the current speed data provided by the position detector 37. This control process is autonomous in the sense that the interface unit will as such only become involved in this control, if need arises to readjust the target speed early communicated to an operator unit on the basis of the position and/or status information communicated to the interface unit from all operator units 3 belonging to the same sub-group of operator unit serving the same movable member.

Whereas the explanation given so far of the structure of the operator unit has been exclusively directed to an operator unit for opening and closing of a movable member it should be noted that to a substantial extent the diagram in FIG. 3 will apply also an operator unit 12 as shown in FIG. 1 for locking and unlocking a movable member such as window wing or sash part with respect to its stationary frame structure. Thus, an operator unit of this type will comprise a microprocessor, a memory and communication interface means as shown in FIG. 3 as well as a reversible drive motor for operation of a locking mechanism such as a conventional pasquil mechanism and a measuring circuit for sensing the motor current. The drive motor would not need, however, to be adjustable in speed, but could be a conventional reversible DC motor. Moreover, as the position information required by the interface unit 6,7 may in some cases be limited to the actual locking status of a movable member, i.e. an indication of the movable member being either in a locked or an unlocked position, the structure and function of the position detector 37 in FIG. 4 may be adapted accordingly.

For both types of operator units the communication with the interface unit 6,7 is preferably conducted as an asynchronous serial transmission on the single communication line 27*c*.

Figure 4:
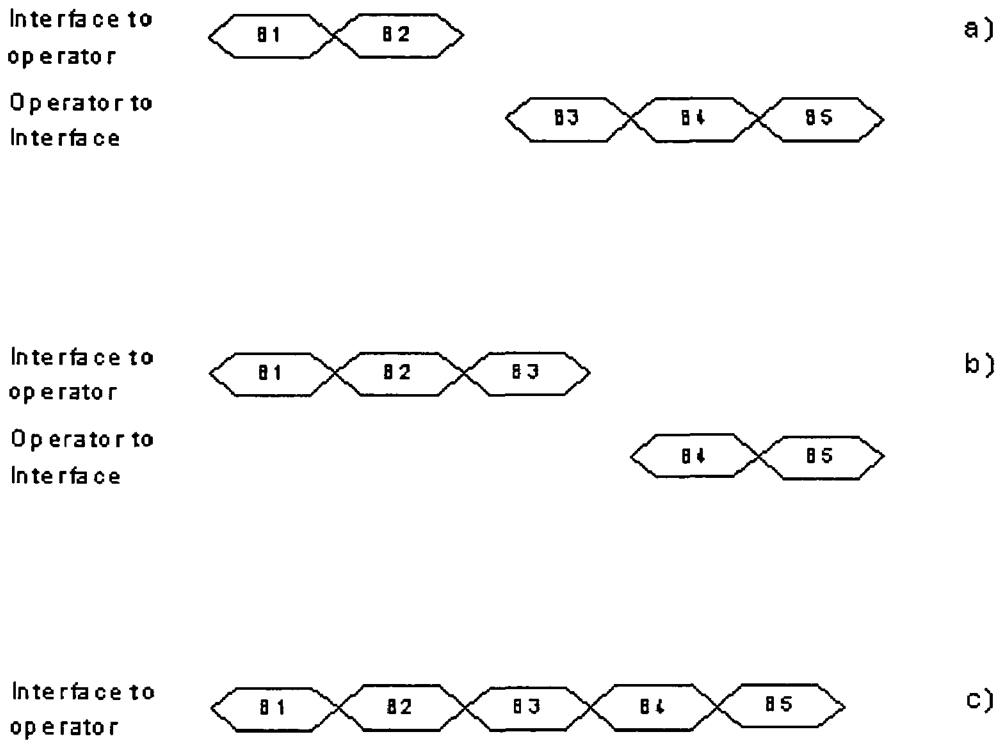
FIG. 4 is a graphic representation of a preferred structure of various communication telegrams between an interface unit as shown in FIG. 2 and an operator unit as shown in FIG. 3.

As illustrated in the simplified graphic representation in FIG. 4 each communication is effected in the form of a telegram comprising 5 bytes B1 to B5 each containing ten bits including one start bit and one stop bit together with eight data bits. Moreover each communication is initiated by the interface unit 6,7 and is directed towards one or more of the operator units in communication with it.

In order to allow communication of sufficient data to all operator units of a single sub-group connected with the same single communication line 27*c*, which as mentioned may comprise a maximum of four operator units 3 for opening and closing of a movable member together with one or two operator units 12 for locking and unlocking, in a timely fashion, the transmission rate for the asynchronous transmission is preferably selected to 9600 Baud. As this transmission rate equals 104 μs per bit the length of the telegrams or data packets can be kept small, e.g. of the order of 5 ms, and with appropriate pauses between successive telegrams, which should generally be longer than the telegrams, it is possible in this way to communicate e.g. target positions and target speeds to all four operator units 3 of a single sub-group within a total time frame of 140 ms.

The selection of a relatively low transmission rate is preferred to limit demands on communication drivers and the microprocessors in the interface unit and the operator unit and reduce the risk of transmission errors, since a time frame of 140 ms for a total communication sequence for a sub-group of operator units would enable relatively simple and safe communication recovery in case of a communication error. Moreover the relatively long pauses between successive telegrams will facilitate detection of the start of each telegram in the operator units and will also provide for sufficient time in the operator units as well as the interface unit for the performance of other tasks allocated to them.

With the preferred transmission rate of 9600 Baud it will be possible to transmit communications over cable lengths up to about fifty meters with use of suitable communication drivers in the interface unit.

In the physical conduct of a transmission the interface unit may generate a 10 mA pull-up signal for the communication line 27*c*. Subsequently, low signal values on the communication line 27*c* may be generated both by the interface unit 6,7 or the operator unit 3 by means of a 20 mA pull-down current from either of these. These current levels enable the drive of input and cable capacitances. In order to provide short circuit protection and for limiting the voltage swing between high and low states, the output current is reduced, when the communication line is out of the ordinary operation range.

The initiation of each telegram transmission from the interface unit has the significant advantage that the available processing resources of the interface unit would not have to be spent on constantly monitoring the communication lines 27*c* for the various sub-groups of operator units for incoming communication.

In the graphic representation in FIG. 4 three examples of five byte telegrams, that may be communicated from the interface unit 6,7 on a communication line, are illustrated at a), b) and c), respectively. In all three examples two of the five bytes, namely the second and the last byte B2 and B5 are used for CRC check sum control to allow detection of communication errors. In each byte of a telegram the start bit is set by the interface unit, whereby the workload on the microprocessors of the interface unit will be reduced.

The telegram example illustrated at a) in FIG. 4 is a "read word" type telegram, which is used in connection with a command transmitted to an operator unit requesting the unit to return information in the form of a complete data word including 16 bits, which in the telegram will occupy two bytes. Examples of the use of this type of command would be a command containing a request to the operator to return information about the current position of the movable member as stored in the memory 33 of the operator, which request must be contained in the first byte B1 of the telegram. Moreover this command may be used in connection with initial set-up the system configuration. As already mentioned the operator units are provided in this situation with a unique factory set serial number code stored in the memory 33. By means of a single communication to the operator units of all sub-groups connected with it, the interface unit 6,7 may by use of the telegram type illustrated at a) request each operator unit to return its factory-set serial number code, which may be a 16 bit word. On the basis of the serial numbers thus returned from all operator units the interface unit may allocate to each of the operator units connected with it a shortened individual communication ID including a number of bits, e.g. four bits for a maximum number of sixteen operator units, which will fit within a single byte of all telegrams to be communicated subsequently. The allocation of such communication ID's may take place by bit-wise arbitration of the factory-set serial numbers returned from the operator units to the interface unit.

The use of a shortened individual command ID is a significant advantage for economizing the communication.

The telegram example illustrated at b) in FIG. 4 is a "read byte" type command for use, when an identified operator unit should be requested to return information of a quantity fitting in a single byte of the telegram. In this case the request with identification of the type of information to be returned will be contained in the first data byte of the telegram, i.e. the third byte B3.

Finally the telegram example illustrated at c) in FIG. 4 is a "write" type command, which is typically used, when the interface unit 6,7 communicates target position and target speed information to an operator unit.

When two or more operator units 3 of the same sub-group are used concurrently for movement of a single movable member, the control of such operator units 3 is coordinated in accordance with the invention and is, thus synchronised to avoid unnecessary mechanical stress on the window or overload on the motor and mechanical parts in the operator units 3.

In this respect, an interface unit 6,7 will receive position information from the operator units 3, e.g. by way of a "read word" type command illustrated in FIG. 4*a*) at regular intervals. If the position information reveals that one of operator units 3 of the sub-group is lacking behind, the interface unit 6,7 will transmit a new lower target speed to the other operator units 3 of the sub-group, whereby allowing the operator unit 3 lacking behind to catch up with the others.

Within the framework of the invention the interface unit 6,7 may retrieve other important status information from operator units 3 connected with it. Such information could include momentary motor current, whereby in response to a sudden increase in motor current in an operator unit, the interface unit may instruct the microprocessor of the operator unit to reduce the duty cycle of the motor current and coordinate this measure with other operator units of the same sub-group to keep all the involved operator units 3 synchronized.

The invention claimed is:

1. A method for controlled operation of movable members by communication of operating commands from centralized and/or distributed control means to operator units for movement of said movable members, characterized by coordination of concurrent operation of operator units of a sub-group (1,2,8–11) of operator units (3) associated with a single movable member by interface means (6,7) interconnected between said sub-group and said centralized and/or distributed control means (4,16), said coordination including communication of an operating command for said single movable member from said central and/or distributed control means (4,16) to said interface means (6,7), generation of actual position and/or status information in each operator unit (3) of said sub-group and communication of said position and/or status information from the operator unit (3) to said interface means (6,7) and using said position and/or status information by said interface means (6,7) for communication of coordinated individual control commands to the operator units (3) of said sub-group (1,2.8–11) in response to said operating command for said single movable member, whereby communication between all operator units of the sub-group and said interface means is effected on a single communication line (27*c*).

2. A method as claimed in claim 1, characterized in that communication between the interface means (6,7) and each operator unit (3) of a sub-group (1,2,8–11) is initiated from said interface means.

3. A method as claimed in claim 1, characterized in that communication between said interface means (6,7) and each operator unit (3) of a sub-group (1,2,8–11) is conducted as asynchronous data communication on said single communication line (27*c*).

4. A method as claimed in claim 1, characterized in that communication between said interface means (6,7) and each operator unit (3) of a sub-group (1,2,8–11) is conducted in the form of a communication telegram containing a limited number of bytes, at least one of which contains identification data for the operator unit.

5. A method as claimed in claim 1, characterized in that operating commands for operation of each single movable member is communicated from said centralized control means (4) to said interface means (6,7) serving the sub-group (1,2,8–11)) of operator units (3,12) associated with said movable member via a common communication bus (14).

6. A method as claimed in claim 1, characterized in that an operating command for operation of a movable member is communicated to said interface means (6,7) from a distributed control means (16) specifically assigned to said movable member.

7. A method as claimed in claim 1, characterized in that electric power for the operator units (3) of a sub-group (1,2,8–11) is supplied from at least one centralized power supply unit (5) via the interface means (6,7) serving said sub-group, the electric power being supplied to said operator units (3) in the form of balanced positive and negative DC voltages on two supply lines (27*a*,27*b*).

8. A method as claimed in claim 1, characterized in that in response to communication of an operating command for said single movable member from said centralized and/or distributed control means (4,16) said interface means (6,7) generates a control command including a target position and a target speed of operation and communicates said control command to each operator unit (3) of said sub-group (1,2, 8–11), and that in dependence of position and/or status information received from the operator units (3,12) new individual control commands including modifications of said target speed as needed to provide synchronized concurrent operation of said operator units (3) is subsequently communicated by said interface means (6,7) to individual operator units (3) of said sub-group (1,2,8–11).

9. A method as claimed in claim 1, characterized by the additional step of coordination by said interface means (6,7) of the concurrent operation of operator units of a sub-group for movement of the movable member associated therewith with sequential operation of an additional operator unit (12) of the sub-group for locking and unlocking of said movable member in its closed position.

10. Use of a method as claimed in claim 1 for computerized control of the operation of passive ventilation members in a natural ventilation system for ventilation of one or more ventilating zones in a building.

11. A method as claimed in claim 3, characterized in that the asynchronous data communication on said single communication line (27*c*) is conducted at a reference voltage level of said positive and negative DC voltages.

12. A control system for operation of movable members, said system comprising operator units for movement of said movable members and centralized and/or distributed control means for communication of operating commands to said operator units, characterized in that for at least one movable ventilation member a sub-group (1,2,8–11) of associated operator units (3) is provided, and that an interface unit (6,7) common to the operator units (3) of said sub-group (1,2, 8–11) is interconnected between each operator unit (3) of the sub-group (1,2,8–11) and said centralized and/or distributed control means (4,16) for coordinated concurrent operation of said associated operator units (3,12), each associated operator unit (3) comprising means for generation of actual position and/or status information for said movable member and said interface unit (6,7) comprising microprocessor means adapted to receive said operating commands from said centralized and/or distributed control means (4,16) and said actual position and/or status information and to communicate coordinated individual control commands to the operator units (3) of the sub-group in response to said operating command and said position and/or status information, whereby all communication between said interface unit (6,7) and each operator unit (3) of said sub-group (1,2,8–11) is effected on a single communication line (27*c*).

13. A control system as claimed in claim 12, characterized in that the interface unit (6,7) is connected with said centralized control means (4) via a communication bus (14) common to a number of interface units (6,7).

14. A control system as claimed in claim 12, characterized in that the interface unit (6,7) is connected with at least one distributed control means (16) specifically assigned to said single movable member.

15. A control system as claimed in claim 12, characterized in that the microprocessor means of the interface unit (6.7) is adapted for communication of control commands for the operator units (3) and said position and/or status information from the operator units by asynchronous data communication via said single communication line (27*c*).

16. A control system as claimed in claim 12, characterized in that the interface unit (6,7) is connected with at least one centralized power supply unit (5) for supply of electrical power to the operator units (3) of the sub-group (1,2,8–11) and is connected with each of said operator units (3) via two power supply lines. (27*a*,27*b*).

17. A control system as claimed in claim 12, characterized in that each operator unit (3) of the sub-group (1,2,8–11) comprises means for setting of a target position for movement of said movable member of the single ventilation member and means for adjustment of a target speed for movement of said movable member towards said target position and that the microprocessor means of the interface unit (6,7) is adapted for including target position and/or target speed data in control commands communicated to said operator units (3,12).

18. A control system as claimed in claim 12, characterized in that at least one sub-group comprises, in addition to said operator units (3) for movement of the single movable member associated with the sub-group an additional operator unit (12) for locking and unlocking of said movable member in its closed position, sequential operation of said additional operator unit (12) being coordinated with said concurrent operation of the operator units (3) for movement of said single movable member.

19. An interface unit for use in a control system as claimed in claim 12, characterized by being adapted for interconnection between a sub-group (1,2,8–11) of operator units (3) associated with a single movable member and said centralized and/or distributed control means (4,16) for coordinated concurrent operation of operator units (3) of said sub-group (1,2,8–11) for movement of said movable member and by comprising microprocessor means adapted to receive said operating commands from said centralized and/or distributed control means (4,16) and said actual position and/or status information and to communicate coordinated control commands to individual operator units (3) of the sub-group (1,2,8–11) in response to said operating command and said position and/or status information, the interface unit (6,7) comprising means for communication with all operator units (3) of said sub-group (1,2,8–11) via a single communication line (27*c*).

20. An operator unit for use in a control system as claimed in claim 12, c characterized by comprising a motion transfer member for movement of a movable member, means for generation of actual position and/or status information for said movable member and means for communication with said interface unit (6,7) via a single communication line (27*c*).

21. Use of a control system as claimed in claim 12 for the operation of passive ventilation members in a natural ventilation system for ventilation of one or more ventilating zones in a building.

22. A control system as claimed in claim 16, characterized in that the interface unit (6,7) comprises means for supply of electric power to each operator unit (3) of the sub-group (1,2,8–11) as balanced positive and negative DC voltages on said power supply lines 27*a*, 27*b*).

23. A control system as claimed in claim 15, characterized in that the interface unit (6,7) comprises means for conducting said data communication on said single communication line (27*c*) at a reference voltage level of said positive and negative DC voltages.

24. An interface unit as claimed in claim 19, characterized by comprising means for communication with said centralized control means (4) via a communication bus (14) common to a number of interface units (6,7).

25. An interface unit as claimed in claim 19, characterized by comprising means (25) for communication with at least one distributed control means (16) specifically assigned to said single movable member.

26. An interface unit as claimed in claim 19, characterized in that said microprocessor is adapted for communication of control commands for operator units (3) and position and/or status information from operator units (3) by asynchronous data communication via said single communication line (27*c*).

27. An interface unit as claimed in claim 19, characterized by comprising means (17) for connection with centralized power supply unit (5) for supply of electrical power to the operator units (3) of the sub-group (1,2,8–11) and for connection with each of said operator units (3) via two power supply lines (27*a*,27*b*).

28. An interface unit as claimed in claim 19, characterized in that said microprocessor means (18) is adapted for including said target position and/or target speed in control commands communicated to said operator units (3).

29. An interface unit as claimed in claim 19, characterized by being adapted for connection with an additional operator unit (12) in at lest one sub-group for locking and unlocking of said movable member in its closed position and for coordination of sequential operation of said additional operator unit (12) with said concurrent operation of said operator units (3) for movement of said movable member.

30. An operator unit as claimed in claim 20, characterized by comprising means for setting of a target position for movement of said motion transfer member and means for adjustment of a target speed for movement of said motion transfer member towards said target position.

31. Use of an interface unit as claimed in claim 19 for the operation of passive ventilation members in a natural ventilation system for ventilation of one or more ventilating zones in a building.

32. Use of an operator unit as claimed in claim 20 for the operation of a passive ventilation member in a natural ventilation system for ventilation of one or more ventilating zones in a building.

33. An interface unit as claimed in claim 27, characterized by comprising means for supply of electric power to each operator unit (3) of the sub-group as balanced positive and negative DC voltages on said power supply lines (27*a*, 27*b*).

34. An interface unit as claimed in claim 26, characterized by comprising means for conducting said data communication on said single communication line (27*c*) at a reference voltage level of said positive and negative DC voltages.

* * * * *